United States Patent
Niwa et al.

(10) Patent No.: US 7,823,980 B2
(45) Date of Patent: Nov. 2, 2010

(54) PIECES FOR SKIN MEMBERS OF VEHICULAR SEATS AND METHODS OF MANUFACTURING THE SAME

(75) Inventors: Yoshitaka Niwa, Kariya (JP); Soji Yasukawa, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/243,266

(22) Filed: Oct. 1, 2008

(65) Prior Publication Data
US 2009/0146483 A1    Jun. 11, 2009

(30) Foreign Application Priority Data
Dec. 7, 2007    (JP) .............................. 2007-317031

(51) Int. Cl.
A47C 31/02    (2006.01)
A47C 7/24    (2006.01)
(52) U.S. Cl. ............................ 297/452.61; 297/452.58; 297/452.62; 297/218.2
(58) Field of Classification Search ............. 297/218.2, 297/452.58, 452.61, 452.62
See application file for complete search history.

(56) References Cited

U.S. PATENT DOCUMENTS

| | | | | |
|---|---|---|---|---|
| 3,712,673 A | * | 1/1973 | Swenson ................ | 297/452.61 |
| 3,774,968 A | * | 11/1973 | Fenton ................... | 297/452.61 |
| 3,874,731 A | * | 4/1975 | Jordan ................ | 297/452.61 X |
| 4,650,251 A | * | 3/1987 | Shimada ................. | 297/452.61 |
| 4,798,416 A | * | 1/1989 | Faust et al. ............ | 297/452.62 |
| 4,849,046 A | * | 7/1989 | Kanazawa et al. .. | 297/452.61 X |
| 5,016,941 A | * | 5/1991 | Yokota ................... | 297/452.61 |
| 5,395,473 A | * | 3/1995 | Nixon ................ | 297/452.62 X |
| 5,544,942 A | * | 8/1996 | Vu Khac et al. ..... | 297/452.61 X |
| 5,607,201 A | | 3/1997 | Irie et al. | |
| 5,630,643 A | * | 5/1997 | Scholten et al. .......... | 297/218.2 |
| 5,669,670 A | * | 9/1997 | Haraguchi et al. ..... | 297/452.61 |
| 5,858,159 A | * | 1/1999 | Holbrook et al. .... | 297/452.61 X |
| 5,882,073 A | * | 3/1999 | Burchi et al. ............ | 297/218.2 |
| 6,345,865 B1 | * | 2/2002 | Ashida et al. ....... | 297/452.61 X |

(Continued)

FOREIGN PATENT DOCUMENTS

JP    6-285277 A    10/1994

(Continued)

OTHER PUBLICATIONS

English language Abstract and translation JP 2005-006874 A, Jan. 2005.

(Continued)

*Primary Examiner*—Rodney B White
(74) *Attorney, Agent, or Firm*—Greenblum & Bernstein, P.L.C.

(57) ABSTRACT

A piece for a skin member of a vehicular seat has a base member and a leather laminated to the base member. The base member has a cushion having elastic properties and a base cloth adhered to the cushion. The base member and the leather include an adhering portion bonded by an adhering agent, a sewing portion formed by being sewn at outer peripheral portions of the base member and the leather, and a nonbonding portion in which the base member and the leather are not bonded between the adhering portion and the sewing portion.

5 Claims, 5 Drawing Sheets

U.S. PATENT DOCUMENTS

| | | | |
|---|---|---|---|
| 7,401,829 B2 * | 7/2008 | Michalski et al. | ... 297/452.62 X |
| 7,425,040 B1 * | 9/2008 | Honma | ............... 297/452.58 X |
| 7,481,489 B2 * | 1/2009 | Demick | ............... 297/218.2 X |
| 7,487,575 B2 * | 2/2009 | Smith | ................... 297/218.2 X |
| 7,559,100 B2 * | 7/2009 | Pedde et al. | .......... 297/218.2 X |
| 7,585,030 B2 * | 9/2009 | Galbreath et al. | ... 297/452.58 X |
| 7,588,290 B2 * | 9/2009 | Takezawa | ................ 297/218.2 |
| 2004/0051367 A1 * | 3/2004 | Banovic et al. | ........ 297/452.58 |
| 2004/0256904 A1 | 12/2004 | Takei | |
| 2009/0146470 A1 * | 6/2009 | Thompson et al. | .... 297/218.2 X |

FOREIGN PATENT DOCUMENTS

| | | |
|---|---|---|
| JP | 8-309048 A | 11/1996 |
| JP | 2005-006874 A | 1/2005 |

OTHER PUBLICATIONS

English language Abstract and translation JP 8-309048 A, Nov. 1996.
English language Abstract and translation JP 6-285277 A, Oct. 1994.

* cited by examiner

PIECES FOR SKIN MEMBERS OF VEHICULAR SEATS AND METHODS OF MANUFACTURING THE SAME

This application claims priority to Japanese patent application serial number 2007-317031, the contents of which are incorporated herein by reference.

BACKGROUND OF THE INVENTION

1. Field of the Invention

The present invention relates to a piece for a skin member of a vehicular seat constituting an outer surface of the vehicular seat, particularly relates to a piece for a leather-made skin member.

2. Description of the Related Art

In general, a skin member of a vehicular seat is formed by sewing together a plurality of pieces. Each piece includes a leather and a base member in layers in a leather-made case. The skin and the base member are bonded by an adhering agent or sewing (refer to Japanese Laid-Open Patent Publication No. 2005-6874, Japanese Laid-Open Patent Publication No. H08-309048 and Japanese Laid-Open Patent Publication No. H06-285277).

However, there has not been known one piece fixed with an adhering portion and a sewing portion at inside thereof. Because when the portions are made to be simply contiguous to each other, a problem can be posed between the portions. For example, a strange feeling is brought about in being seated on the vehicular seat, or a wrinkle is brought about in the leather in fabrication or the like. A cause of bringing about the strange feeling or the wrinkle is that whereas the leather is moved integrally with the base member at the adhering portion, the leather can be shifted relative to the base member at the sewing portion. Therefore, there is needed a piece for a skin member of a vehicular seat having a constitution including an adhering portion adhering a leather and a base member and a sewing portion of sewing the leather and the base member in one piece and capable of alleviating a problem which can be brought about between the portions.

SUMMARY OF THE INVENTION

One aspect of the present invention can include a piece for a skin member of a vehicular seat having a base member and a leather laminated to the base member. The base member includes a cushion seat having an elastic performance and a base cloth adhered to the cushion seat in layers. The base member and the leather include an adhering portion bonded by an adhering agent in layers, a sewing portion formed by being sewn outer peripheral portions of the base member and the leather in layers, and a nonbonding portion therein the base member and the leather are not bonded between the adhering portion and the sewing portion.

Therefore, a problem which can be posed between the adhering portion and the sewing portion can be alleviated by the nonbonding portion. For example, when the leather is exerted with an external force, the leather is deformed integrally with the base member at the adhering portion, the leather is deformed by being shifted relative to the base member at the sewing portion. Therefore, since a method of absorbing the force differs between the adhering portion and the sewing portion, a strange feeling can be brought about between the adhering portion and the sewing portion or a wrinkle can be brought about in being seated. In contrast thereto, the nonbonding portion can alleviate a difference in deformation between the adhering portion and the sewing portion. Therefore, the strange feeling or the wrinkle can be alleviated by the nonbonding portion.

DETAILED DESCRIPTION OF THE INVENTION

Each of the additional features and teachings disclosed above and below may be utilized separately or in conjunction with other features and teachings to provide improved pieces of skin members of vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
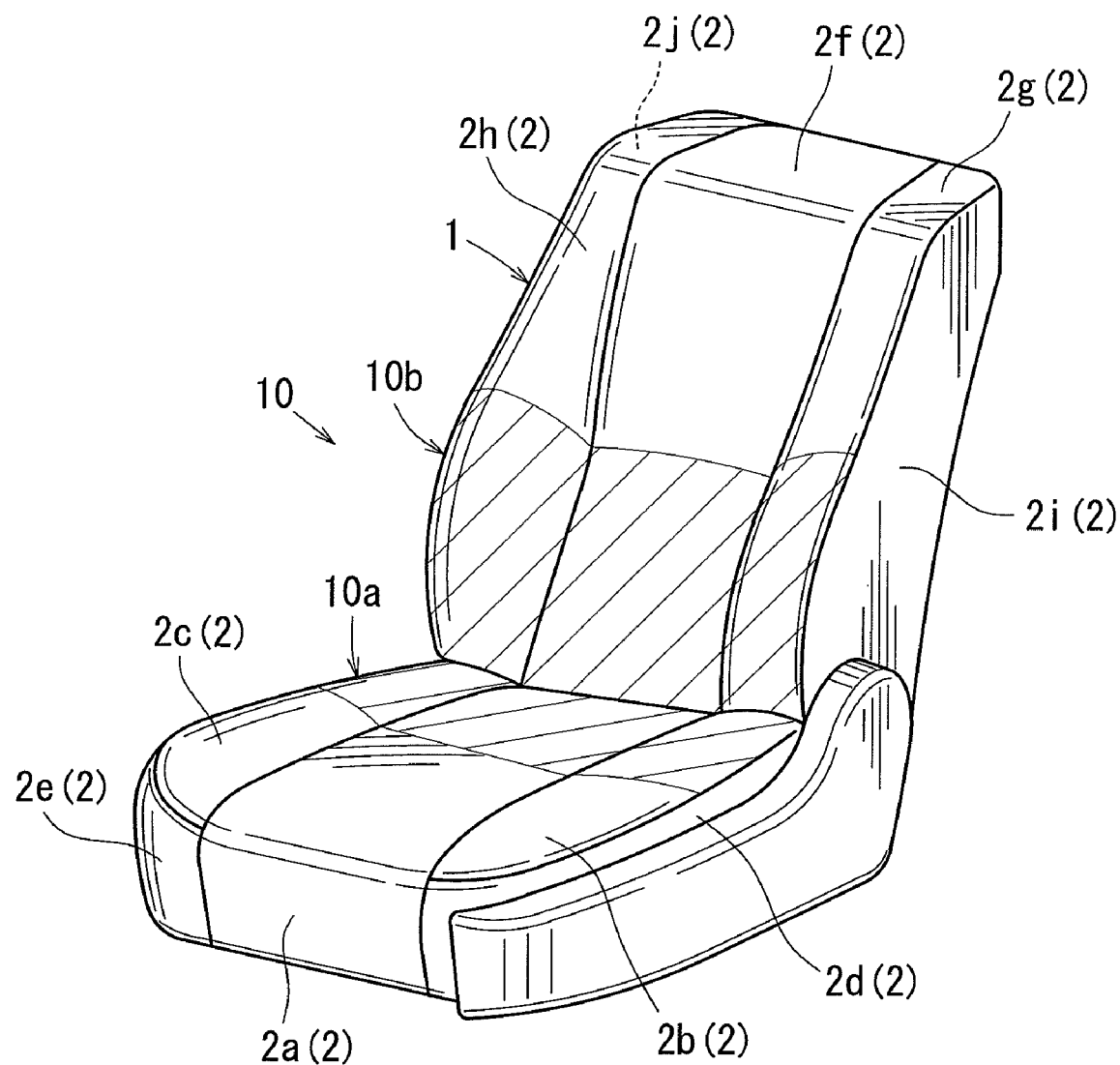
FIG. 1 is a perspective view of a vehicular seat.

As shown in FIG. 1, a vehicular seat 10 includes a seat cushion 10a (also called a lower seat member) and a seat back 10b (also called a upper seat member). The seat back 10b is connected to a rear portion of the seat cushion 10a to be able to adjust an angle therebetween. The seat cushion 10a and the seat back 10b include a frame, not illustrated, a pad mounted to the frame, and a skin member 1 covering an outer surface of the pad.

Figure 2:
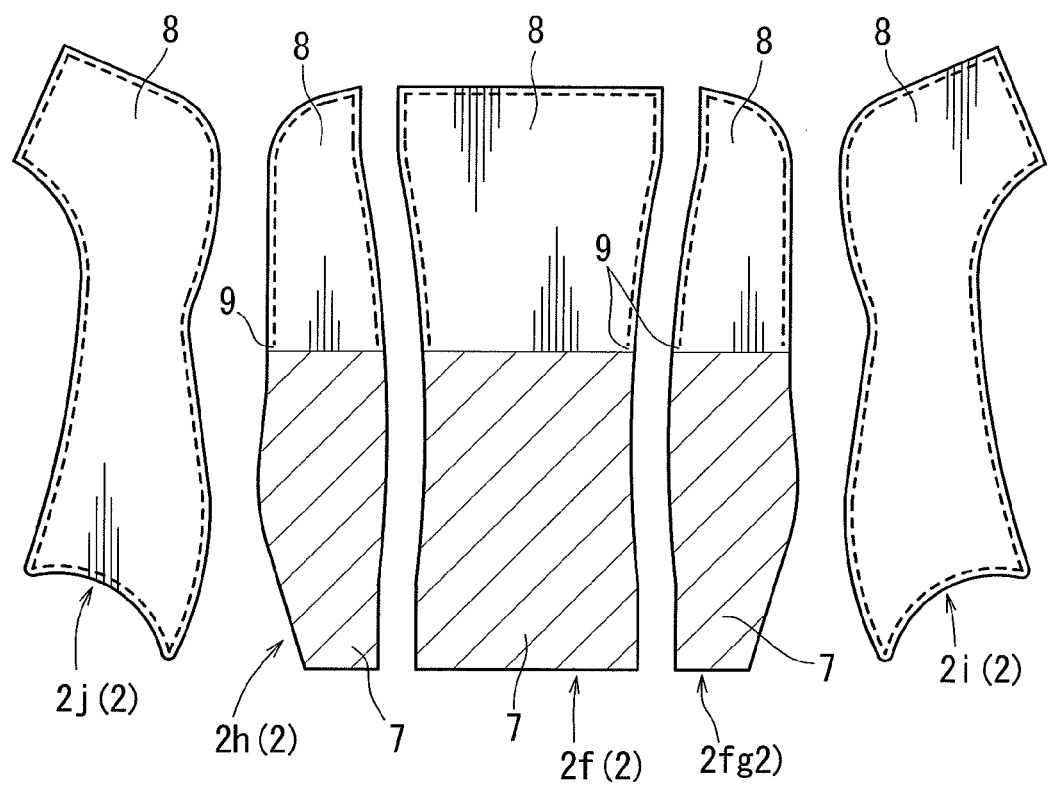
FIG. 2 is a development view of a skin member.
Figure 2:
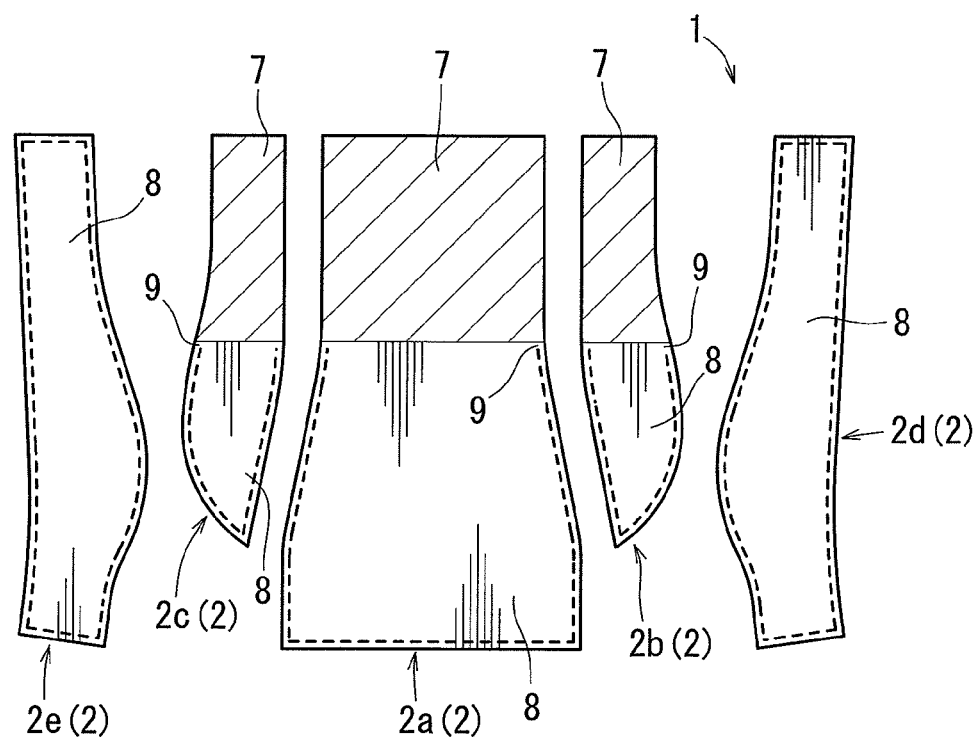

The skin member 1 is constituted by a plurality of pieces 2 as shown in FIGS. 1 and 2. The skin member 1 on a side of the seat cushion 10a is constituted by a center piece 2a, left and right side pieces 2b and 2c and left and right side face pieces 2d and 2e. The pieces 2a through 2e extend in a front and rear direction of the seat cushion 10a. Further, the pieces are aligned in a short direction (left and right direction) and seamed together by a sewing machine. The skin member 1 of the seat back 10b is constituted by a center piece 2f, left and right side pieces 2g and 2h and left and right side face pieces 2i and 2j. The pieces 2f through 2j extend in an up and down direction of the seat back 10b. Further, the pieces are aligned in the short direction (left and right direction) and seamed together by a sewing machine.

Figure 3:
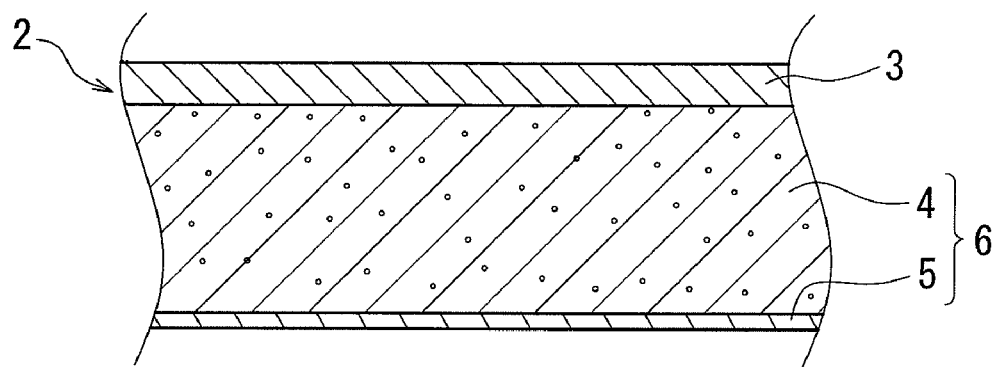
FIG. 3 is a cross-sectional view of a piece for the skin member.

The skin member 1 is constituted by a plurality of layers as shown in FIG. 3, includes a leather 3 on a surface side and includes a base member 6 on a back side. The leather 3 can be an animal hide of a cattle hide, a horse hide or the like. The base member 6 includes a cushion (cushion seat) 4 and a base cloth 5. Further, the cushion 4 and the base cloth 5 can be bonded by an adhering agent over an entire face thereof.

The cushion 4 can be formed by an elastic material. For example, the elastic material can be a slab urethane (in other words, foamed member comprising soft urethane foam), needle punch carpet, 3D net (made from nylon or polyester or the like), a nonwoven cloth of felt or the like. The base cloth 5 is formed by a woven cloth (for example, tricot), nonwoven cloth (for example, nylon species) or the like. A thickness of the cushion 4 is preferably equal to or larger than 5 mm from a view point of a spring performance, further preferably, 10±2 mm.

Figure 4:
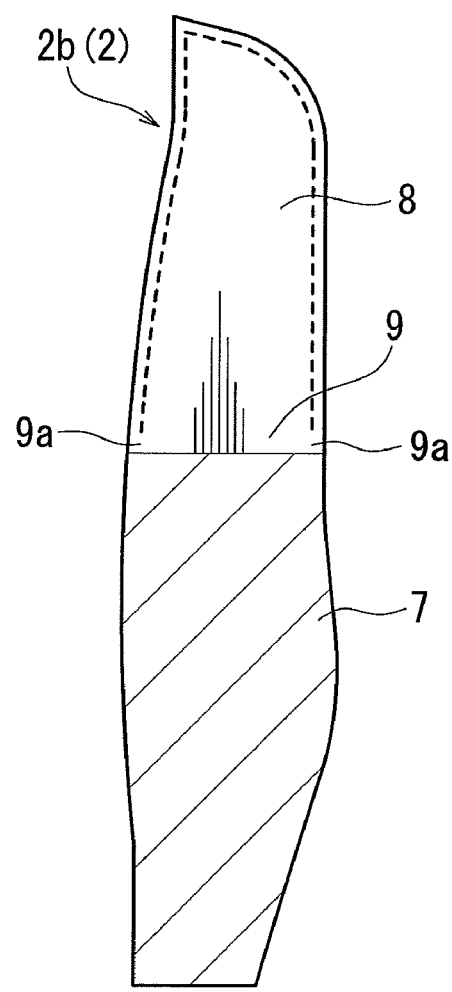
FIG. 4 is a front view of a side piece.

The leather 3 is bonded to a surface of the base member 6 by adhering or sewing. As shown in FIG. 4, the side piece 2b includes an adhering portion 7 and a sewing portion 8 in one piece. At the adhering portion 7, the leather 3 and the base member 6 are adhered by an adhering agent. At the sewing portion 8, the leather 3 and the base member 6 are sewn at outer peripheral portions thereof by a sewing machine. The side piece 2b includes the adhering portion 7 substantially at a half thereof in a longitudinal direction and includes the sewing portion 8 substantially at a remaining half thereof.

Further, as shown in FIG. 4, the side piece 2b includes a nonbonding portion between the adhering portion 7 and the sewing portion 8. At the nonbonding portion 9, the leather 3 and the base member 6 are not bonded. A width of the nonbonding portion 9 is set to, for example, 20±10 mm. Further, the nonbonding portion 9 crosses the side piece 2b in a short direction substantially at a center of the side piece 2b to divide the adhering portion 7 and the sewing portion 8.

According to a method of fabricating the side piece 2b, first, the base member 6 and the leather 3 are cut substantially in the same shape by a press or the like. Next, an adhering agent is coated at a portion of the surface of the base member 6. When coated, other portion is masked and the adhering agent is coated by a spray or the like under the state. Further, the leather 3 is laminated on the surface side of the base member 6 and a portion of the base member 6 and a portion of the leather 3 are adhered (refer to FIG. 3). Next, the base member 6 and the leather 3 are sewn by a sewing machine along outer peripheral portions thereof while avoiding the nonbonding portion 9. In other words, the sewing is carried out along three sides of the outer peripheral portions. Thereby, the adhering portion 7 and the sewing portion 8 and the nonbonding portion 9 are formed at the side piece 2b.

As shown in FIG. 2, similar to the side piece 2b, the center pieces 2a and 2f and the side pieces 2c, 2g and 2h include the adhering portions 7 and the sewing portions 8 and the nonbonding portions 9. On the other hand, the side face pieces 2d, 2e, 2i and 2j include the sewing portions 8 only. That is, the side face pieces 2d, 2e, 2i and 2j are bonded by sewing the leather 3 and the base member 6 along entire peripheries of outer peripheral portions.

Figure 5:
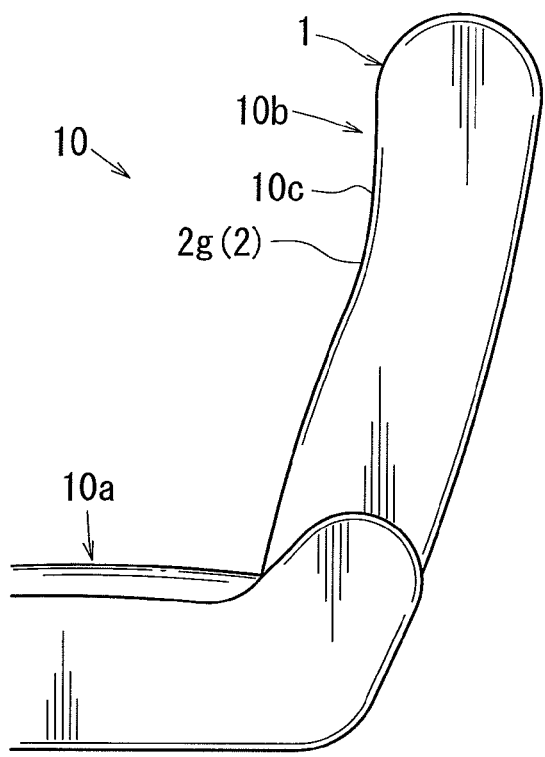
FIG. 5 is a right side view of a part of the vehicular seat.
Figure 6:
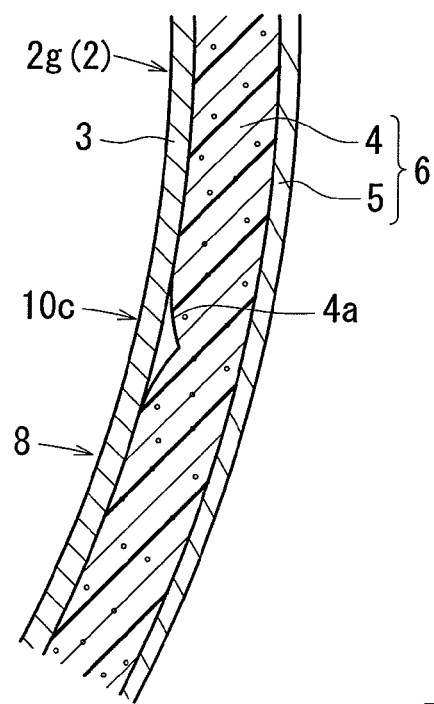
FIG. 6 is a cross-sectional view of the piece for the skin member around a recess portion.

As shown in FIG. 1, according to the piece 2, the adhering portion 7 is arranged at a rear side portion of the seat cushion 10a or a lower side portion of the seat back 10b. Further, the sewing portion 8 is arranged at a front side portion of the seat cushion 10a or at an upper side portion of the seat back 10b. As shown in FIG. 5, the seat back 10b includes a recess portion 10c at an upper side portion. Further, a surface of the recess portion 10c is installed with the sewing portion 8. As shown in FIG. 6, at the recess portion 10c, a peripheral length difference is produced between the back face side and the surface side. Therefore, a fold-bend portion 4a is brought about at the cushion 4 by the peripheral length difference. However, the leather 3 is not adhered to the cushion 4, and therefore, the leather 3 is not folded to bend along with the cushion 4. Therefore, a wrinkle is not brought about in the leather 3.

Figure 7:
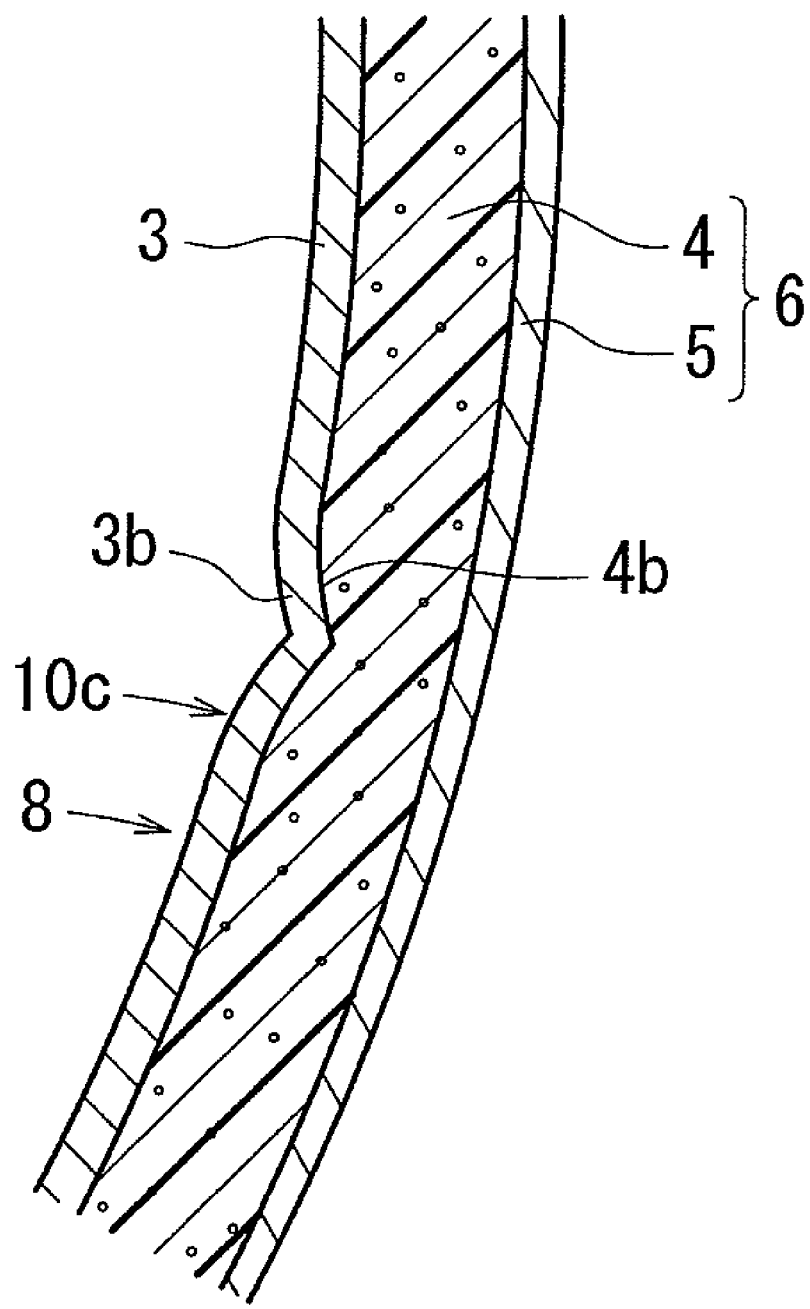
FIG. 7 is a cross-sectional view of the piece for the skin member when an adhering portion of the piece is set on the recess portion.

When the adhering portion 7 is arranged assumedly at the recess portion 10c as shown in FIG. 7, a fold-bend portion 4b can be formed at the cushion 4 by the peripheral length difference produced between the back face side and the surface side. Further, the fold-bend portion 4b is brought about also at the leather 3 by following the cushion 4. Therefore, a wrinkle can be formed at the leather 3. Therefore, according to the present invention, the wrinkle of the leather 3 shown in FIG. 7 can be restrained from being brought about (as shown in FIG. 6).

As shown in FIG. 2, the pieces 2a through 2c, and 2f through 2h include the adhering portions 7 and the sewing portions 8 and include the nonbonding portions 9 between the adhering portions 7 and the sewing portions 8. Therefore, a problem which can be posed between the adhering portion 7 and the sewing portion 8 can be alleviated by the nonbonding portion 9. For example, when the leather 3 is exerted with an external force, the leather 3 is deformed integrally with the base member 6 at the adhering portion 7, the leather 3 is deformed by being shifted relative to the base member 6 at the sewing portion 8. Therefore, since a method of absorbing the force differs between the adhering portion 7 and the sewing portion 8, a strange feeling can be brought about between the adhering portion 7 and the sewing portion 8 or a wrinkle can be brought about from being seated. In contrast thereto, the nonbonding portion 9 can alleviate a difference in deformation between the adhering portion 7 and the sewing portion 8. Therefore, the strange feeling or the wrinkle can be alleviated by the nonbonding portion 9.

Further, as shown in FIG. 1, the adhering portion 7 is arranged at the rear side portion of the seat cushion 10a, the rear side portion is adjacent to the seat back 10b. Or the adhering portion 7 is arranged at the lower side portion of the seat back 10b, the lower side portion is adjacent to the seat cushion 10a. The rear side portion of the seat cushion 10a or the lower side portion of the seat back 10b is a portion at which the leather 3 is easy to be pulled since a passenger slides the body in getting in and off a vehicle. In contrast thereto, at the adhering portion 7, the leather 3 is adhered to the base member 6. Therefore, the base member 6 can restrain the stretching of the leather 3 when a user gets in and out of the vehicle. Further, the nonbonding portion 9 can be alleviated a difference in the stretch of the leather 3 which can be produced between the adhering portion 7 and the sewing portion 8.

Further, as shown in FIG. 6, the sewing portion 8 is arranged at an outer surface of the recess portion 10c of the seat 10. When the outer surface of the recess portion 10c is installed with the piece 2, the peripheral length difference is produced between the surface side and the rear face side of the piece 2. Further, the base member 6 is folded to bend by the peripheral length difference. However, the recess portion 10c is arranged with the sewing portion 8 and at the sewing portion 8, the leather 3 is not adhered to the base member 6. Therefore, the leather 3 is not folded to bend along with the base member 6 and a wrinkle can be restrained from being formed in leather 3.

Further, the piece 2 is produced by a method first forming the adhering portion 7 and then forming the sewing portion 8 thereafter. Therefore, the piece 2 can be formed more easily than by a reverse method thereto. For example, when the sewing portion 8 is formed, thereafter, the adhering portion 7 is formed, it is necessary to coat the adhering agent on the base member 6 while pealing up the leather 3 at the portion constituting the adhering portion 7. Further, it is necessary to carry out masking in consideration of the pealed-up portion and the nonbonding portion 9. Therefore the masking operation becomes complicated. In contrast thereto, according to the method of the above embodiment, the pealing up operation is not used, resulting in a more efficient masking operation. Further, in sewing, a shift between the leather 3 and the base member 6 can be produced around a distal end of the sewing, however the nonbonding portion 9 can also alleviate the shift.

Further, as shown in FIG. 3, the piece 2 includes the base cloth 5 at a side face opposed to the leather 3. Therefore, when the base member 6 is fed by a feed dog of the sewing machine, the base cloth 5 can be fed by the feed dog. Therefore, in comparison with a case of feeding the cushion 4 by the feed dog, the base member 6 can be fed smoothly by the feed dog.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the present invention should not be limited to the representative configurations, but may be modified as described below.

(1) In FIG. 3, the base member 6 includes the cushion 4 on the surface side and includes the base cloth 5 on the back side. However, there may be a base member including the base cloth on the surface side and including the cushion seat on the back side.

(2) In FIG. 3, the base member 6 includes respective single layers of the cushion 4 and the base cloth 5. However, there may be a configuration including two layers or more of either of the cushion 4 and the base cloth 5, or two layers or more of both thereof.

(3) In the base member 6 and the leather 3, the adhering portion 7 is precedingly formed and the sewing portion 8 is formed thereafter. However, there may be a configuration of precedingly forming the sewing portion 8 and forming the adhering portion 7 thereafter.

(4) In FIGS. 1 and 2, the skin member 1 includes three sheets of the pieces 2 including the adhering portions 7 and the sewing portions 8 proximately to the center. However, there may be a configuration of including one sheet or two sheets of the pieces or the like.

What is claimed is:

1. A skin member including a plurality of skin member pieces for covering an outer surface of a vehicular seat, at least one of the skin member pieces comprising:
a base member including a cushion having elastic properties and a base cloth adhered to the cushion, the cushion and the base cloth being bonded by a first adhering agent over an entire face thereof; and
a leather laminated to the base member,
wherein the base member and the leather include an adhering portion, a sewing portion, and a nonbonding portion,
wherein the adhering portion bonds the base member and the leather with a second adhering agent at a first portion of the at least one skin member piece, the first portion extending across an entire area in a width direction of the at least one skin member piece,
wherein the sewing portion bonds the base member and the leather along outer peripheral portions of a second portion of the at least one skin member piece,
wherein the nonbonding portion is provided between the first portion and the second portion of the at least one skin member piece and separates the adhering portion from the sewing portion, and
wherein the base member and the leather are not bonded between the adhering portion and the sewing portion.

2. A vehicular seat comprising:
a lower seat member;
an upper seat member; and
a skin member including a plurality of skin member pieces for covering an outer surface of the vehicular seat, at least one of the skin member pieces having:
a base member including a cushion having elastic properties and a base cloth adhered to the cushion, the cushion and the base cloth being bonded by a first adhering agent over an entire face thereof, and
a leather laminated to the base member,
wherein the base member and the leather include an adhering portion, a sewing portion, and a nonbonding portion,
wherein the adhering portion bonds the base member and the leather with a second adhering agent at a first portion of the at least one skin member piece, the first portion extending across an entire area in a width direction of the at least one skin member piece,
wherein the sewing portion bonds the base member and the leather along outer peripheral portions of a second portion of the at least one skin member piece,
wherein the nonbonding portion is provided between the first portion and the second portion of the at least one skin member piece and separates the adhering portion from the sewing portion, and
wherein the base member and the leather are not bonded between the adhering portion and the sewing portion.

3. The vehicular seat as in claim 2, wherein the adhering portion is arranged on one side portion of the lower seat member, and the one side portion of the lower seat member is connected with the upper seat member.

4. The vehicular seat as in claim 2, wherein the adhering portion is arranged on one side portion of the upper seat member, and the one side portion of the upper seat member is connected with the lower seat member.

5. The vehicular seat as in claim 2, wherein the sewing portion is arranged at an outer surface of a recess portion.

\* \* \* \* \*